(12) United States Patent
Hattori et al.

(10) Patent No.: US 11,621,415 B2
(45) Date of Patent: Apr. 4, 2023

(54) POSITIVE ELECTRODE ACTIVE MATERIAL AND METHOD OF PRODUCING POSITIVE ELECTRODE ACTIVE MATERIAL

(71) Applicant: NICHIA CORPORATION, Anan (JP)

(72) Inventors: Ryuhei Hattori, Tokushima (JP); Yoshitomo Miyashita, Tokushima (JP); Tatsuya Yokoyama, Anan (JP); Chika Nishio, Anan (JP); Takashi Sugimoto, Tokushima (JP)

(73) Assignee: NICHIA CORPORATION, Anan (JP)

(*) Notice: Subject to any disclaimer, the term of this patent is extended or adjusted under 35 U.S.C. 154(b) by 439 days.

(21) Appl. No.: 16/926,613

(22) Filed: Jul. 10, 2020

(65) Prior Publication Data

US 2021/0013503 A1 Jan. 14, 2021

(30) Foreign Application Priority Data

Jul. 11, 2019 (JP) .............................. JP2019-129204
Jun. 4, 2020 (JP) .............................. JP2020-097755

(51) Int. Cl.
*H01M 4/485* (2010.01)
*H01M 4/131* (2010.01)
*H01M 4/1391* (2010.01)
*C01G 53/00* (2006.01)
*H01M 4/02* (2006.01)

(52) U.S. Cl.
CPC ............ *H01M 4/485* (2013.01); *C01G 53/40* (2013.01); *C01G 53/42* (2013.01); *H01M 4/131* (2013.01); *H01M 4/1391* (2013.01); *C01P 2002/52* (2013.01); *H01M 2004/028* (2013.01)

(58) Field of Classification Search
CPC ....................................................... C01G 53/42
See application file for complete search history.

(56) References Cited

U.S. PATENT DOCUMENTS

| | | |
|---|---|---|
| 2012/0270107 A1 | 10/2012 | Toya et al. |
| 2014/0170494 A1 | 6/2014 | Paulsen et al. |
| 2016/0276665 A1 | 9/2016 | Ide et al. |
| 2018/0090759 A1 | 3/2018 | Suzuki et al. |
| 2018/0212237 A1 | 7/2018 | Lee et al. |
| 2019/0036119 A1 | 1/2019 | Lee et al. |

(Continued)

FOREIGN PATENT DOCUMENTS

| | | |
|---|---|---|
| JP | 2002075367 A | 3/2002 |
| JP | 2003292322 A | 10/2003 |
| JP | 2004171909 A | 6/2004 |

(Continued)

*Primary Examiner* — Peter F Godenschwager
(74) *Attorney, Agent, or Firm* — Hunton Andrews Kurth LLP

(57) ABSTRACT

A method of producing a positive electrode active material, the method includes: contacting first particles that contain a lithium transition metal composite oxide with a solution containing sodium ions to obtain second particles containing the lithium transition metal composite oxide and sodium element, wherein the lithium transition metal composite oxide has a layered structure and a composition ratio of a number of moles of nickel to a total number of moles of metals other than lithium in a range of from 0.7 to less than 1; mixing the second particles and a boron compound to obtain a mixture; and heat-treating the mixture at a temperature in a range of from 100° C. to 450° C.

9 Claims, 2 Drawing Sheets

(56) References Cited

U.S. PATENT DOCUMENTS

2019/0300382 A1   10/2019  Kim et al.
2020/0176807 A1    6/2020  Nishio et al.

FOREIGN PATENT DOCUMENTS

| | | |
|---|---|---|
| JP | 2006012433 A | 1/2006 |
| JP | 2011116580 A | 6/2011 |
| JP | 2011124086 A | 6/2011 |
| JP | 2011146390 A | 7/2011 |
| JP | 2014513392 A | 5/2014 |
| JP | 2015088343 A | 5/2015 |
| JP | 2018049685 A | 3/2018 |
| JP | 2018531500 A | 10/2018 |
| JP | 2019508869 A | 3/2019 |
| JP | 2019522882 A | 8/2019 |
| WO | 2015/076376 A1 | 5/2015 |
| WO | 2019/031508 A1 | 2/2019 |

POSITIVE ELECTRODE ACTIVE MATERIAL AND METHOD OF PRODUCING POSITIVE ELECTRODE ACTIVE MATERIAL

CROSS-REFERENCE TO RELATED APPLICATION

This application claims priority to Japanese Patent Application No. 2019-129204, filed on Jul. 11, 2019, and Japanese Patent Application No. 2020-097755, filed on Jun. 4, 2020, the contents of which are hereby incorporated by reference in their entireties.

BACKGROUND

The present disclosure relates to a positive electrode active material and a method of producing the positive electrode active material.

A positive electrode active material for a non-aqueous electrolyte secondary battery contains a lithium-transition metal composite oxide, such as lithium cobaltate, lithium nickelate, and nickel cobalt lithium manganate. A non-aqueous electrolyte secondary battery containing a lithium nickel-based composite oxide with a higher ratio of nickel, in place of cobalt, a scarce resource, advantageously has a higher electrical charge-discharge capacity per unit weight. However, it is not easy to synthesize a lithium nickel-based composite oxide, and a part of the raw materials unreacted in the synthesis may remain as residual alkaline component. Such residual alkaline component may cause, for example, slurry thickening during electrode fabrication, or gas generation during charging. However, reducing such residual alkaline component by, for example, water-washing may worsen the cycle characteristics of the battery to be produced.

In view of the above, a technique for improving the cycle characteristics of a non-aqueous electrolyte secondary battery to be produced has been proposed by water-washing a lithium nickel-based composite oxide, and then contacting the composite oxide with an aqueous solution of sulfate to cause sulfate to be present on the surface of the primary particles (refer to, for example, Japanese Patent Publication No. 2011-124086). Another proposed technique for improving the cycle characteristics includes water-washing a lithium nickelate-based lithium transition metal composite oxide, mixing the composite oxide with a boron compound, and heat-treating the mixture (refer to, for example, Japanese Patent Publication No. 2015-088343).

SUMMARY

A first aspect is a method of producing a positive electrode active material with good cycle characteristics.

A method of producing a positive electrode active material, the method includes: contacting first particles that contain a lithium transition metal composite oxide with a solution containing sodium ions to obtain second particles containing the lithium transition metal composite oxide and sodium element, wherein the lithium transition metal composite oxide has a layered structure and a composition ratio of a number of moles of nickel to a total number of moles of metals other than lithium in a range of from 0.7 to less than 1; mixing the second particles and a boron compound to obtain a mixture; and heat-treating the mixture at a temperature in a range of from 100° C. to 450° C.

A second aspect is a positive electrode active material containing secondary particles each composed of an aggregate of primary particles that contain a lithium transition metal composite oxide having a layered structure and a composition ratio of the number of moles of nickel to the total number of moles of metals other than lithium of from 0.7 to less than 1. In the positive electrode active material, a compound containing boron is attached on at least a part of the surfaces of the primary particles, a compound containing sodium is present in at least a part of the particle boundaries of the secondary particles, and a value obtained by dividing a standard deviation of detection amounts of boron element in any three regions in a cross-sectional surface of the secondary particles by an average of the detection amounts is less than 0.18.

A third aspect is a non-aqueous electrolyte secondary battery containing the positive electrode active material according to the present disclosure in its positive electrode.

A fourth aspect is an electrode for a non-aqueous electrolyte secondary battery containing a current collector and a positive electrode active material layer arranged on the current collector. The positive electrode active material layer contains the positive electrode active material according to the present disclosure and has a density in a range of 2.8 g/cm$^3$ to 3.7 g/cm$^3$.

DETAILED DESCRIPTION

Figure 1:
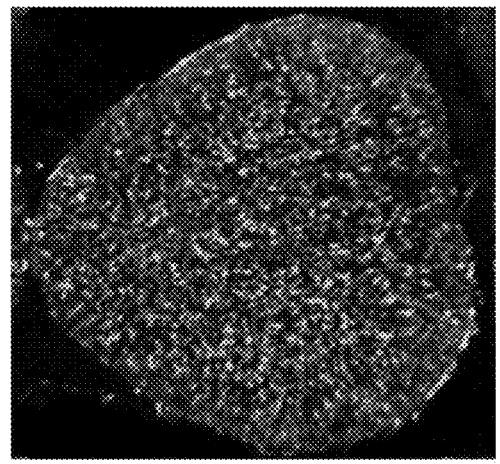
FIG. 1 is an example image showing $BO^{2-}$ dispersion in a positive electrode active material particle of Example 5.

According to an aspect of the present disclosure, a method of producing a positive electrode active material with good cycle characteristics may be provided.

As used herein, the term "step" means not only an independent step but also a step which cannot be clearly distinguished from the other steps but can achieve the desired object. For the amount of each component contained in a composition, when a plurality of substances corresponding to the component are present in the composition, the amount of the component means the total amount of the corresponding substances present in the composition unless otherwise specified. The present invention will now be described in detail by means of embodiments. However, the embodiments shown below are mere examples of the positive electrode active material and the method of producing the positive electrode active material for embodying the technical concept of the present invention, and the present invention is not limited to the positive electrode active material and the method of producing the positive electrode active material described below.

Method of Producing Positive Electrode Active Material

The method of producing a positive electrode active material may include a washing step of contacting first particles that contain a lithium transition metal composite oxide having a layered structure and a composition ratio of the number of moles of nickel to the total number of moles of metals other than lithium in a range of from 0.7 to less than 1 with a solution containing sodium ions to obtain second particles containing the lithium transition metal composite oxide and sodium element, a mixing step of mixing the second particles and a boron compound to obtain a mixture, and a heat-treatment step of heat-treating the mixture at a temperature in a range of from 100° C. to 450° C. The method may further include other steps including a providing step of providing the first particles as appropriate.

The positive electrode active material obtained by washing a lithium transition metal composite oxide having a ratio of the number of moles of nickel in a range of 0.7 and less than 1 with a sodium ion-containing aqueous solution, and then heat-treating the lithium transition metal composite oxide with a boron compound can achieve good cycle characteristics when used in a non-aqueous electrolyte secondary battery. This is seemingly partly because the presence of sodium in the particle boundaries of the secondary particles, which contain the lithium transition metal composite oxide for forming the positive electrode active material, allows boron to be uniformly dispersed across the particle boundaries of the lithium transition metal composite oxide particles.

Providing Step

In the providing step, the first particles containing layer-structured lithium transition metal composite oxide are provided. The lithium transition metal composite oxide to be contained in the first particles contains nickel in its composition, and has a composition ratio of the number of moles of nickel to the total number of moles of metals other than lithium in a range of 0.7 to less than 1. The first particles may be appropriately selected from commercially available products, or may be provided by the provision method as described below.

The provision method of the first particles may include, for example, a precursor provision step of providing precursors, and a synthesis step of synthesizing the first particles containing a lithium transition metal composite oxide from the precursors and a lithium compound. The first particles may be formed, for example, as secondary particles composed of a plurality of primary particles containing the lithium transition metal composite oxide.

In the precursor provision step, a precursor containing a nickel-containing composite oxide is provided. The precursor may be appropriately selected from commercially available products, or may be provided by providing a nickel-containing composite oxide having a desired composition using a common method. Examples of the precursor include nickel-containing composite oxides as well as composite oxides containing nickel and metals other than nickel (for example, Co, Mn, Al, Ti, and Nb).

A nickel-containing composite oxide having a desired composition may be obtained by, for example, a method of mixing raw material compounds (for example, hydroxide and carbonic acid compound) in a manner to meet a target composition, and heat-treating the mixture to decompose the mixture into a nickel-containing composite oxide, or by the coprecipitation method of providing a solution in which raw material compounds are dissolved, forming a precursor precipitate having a target composition through, for example, temperature adjustment, pH adjustment, and introduction of a complexing agent, and heat-treating the precursor precipitate. An example method of producing a nickel-containing composite oxide (hereinafter also simply referred to as "composite oxide") will now be described.

The coprecipitation method of obtaining a composite oxide may include a seed generation step of adjusting pH and others of a mixture solution containing metal ions in a desired ratio to generate seed crystals, a crystallization step of growing the generated seed crystals to obtain a composite hydroxide having desired properties, and a composite hydroxide-obtaining step of heat-treating the resulting composite hydroxide. For the details of such a method of obtaining a composite oxide, refer to, for example, Japanese Patent Publications No. 2003-292322 and Japanese Patent Publication No. 2011-116580 (Specification of U.S. Patent Publication No. 2012/270107).

In the seed generation step, a mixture solution containing nickel ions at a desired ratio may be adjusted to have a pH of, for example, in a range of from 11 to 13 to provide a liquid medium containing seed crystals. The seed crystals may, for example, contain hydroxide containing nickel in a desired ratio. The mixture solution may be provided by dissolving a nickel salt in water in a desired ratio. Examples of the nickel salt include sulfate, nitrate, and hydrochloride. In addition to the nickel salt, the mixture solution may contain other metal salts in a desired ratio as appropriate. The seed generation step may be carried out at a temperature of, for example, from 40° C. to 80° C., and in a low-oxidation atmosphere with an oxygen concentration of, for example, 10% by volume or less.

In the crystallization step, the generated seed crystals are grown to obtain a nickel-containing precursor precipitate with desired properties. The seed crystals may be grown by, for example, adding a mixture solution containing nickel ions and other metal ions as appropriate to the liquid medium containing the seed crystals while maintaining the pH of the liquid medium in a range of, for example, from 7 to 12.5, and preferably 7.5 to 12. The mixture solution is added in a period of, for example, from 1 hour to 24 hours, and preferably from 3 hours to 18 hours. The crystallization step may be carried out at a temperature of, for example, 40° C. to 80° C. in the same atmosphere as the seed generation step.

In the seed generation and crystallization steps, the pH may be adjusted using an aqueous acidic solution, such as an aqueous solution of sulfuric acid and an aqueous solution of nitric acid, or an aqueous alkaline solution, such as an aqueous solution of sodium hydroxide and an ammonia water.

In the crystallization step, it is desirable to control the particle diameter of the precursor precipitate. The particle diameter of the precursor precipitate may be controlled by adjusting, for example, the temperature and pH of the reaction site, and the stirring speed. These conditions may be appropriately adjusted in accordance with the actual conditions including the shape of the container containing the reaction site, the starting materials, and the speed at which the starting materials are supplied into the reaction site. The particle diameter of the precursor precipitate may also be controlled by adjusting, for example, the aging time since the precursor precipitate starts to precipitate and the stirring speed in accordance with the actual conditions because the particle growth rate, the particle shape, and so forth vary depending on the shape of the reaction container.

In the composite oxide-obtaining step, the precursor precipitate containing the composite hydroxide obtained in the crystallization step is heat-treated to obtain a composite oxide. The heat treatment may be carried out by heating the composite hydroxide at a temperature of, for example, 500° C. or less, and preferably 350° C. or less. The heat treatment temperature is, for example, 100° C. or more, and preferably 200° C. or more. The heat treatment period is, for example, 0.5 hours to 48 hours, and preferably 5 hours to 24 hours. The heat treatment atmosphere may be the air or an oxygen-containing atmosphere. The heat treatment may be carried out using, for example, a box furnace, a rotary kiln furnace, a pusher furnace, and a roller hearth kiln furnace.

The resulting composite oxide may contain other metal elements in addition to nickel. Examples of the other metals include Co, Mn, Al, Ti, and Nb, and at least one selected from the group consisting of these metals is preferable, and at least one selected from the group consisting of Co, Mn, and Al is more preferable. A composite oxide containing other metals may be obtained by preparing a mixture solution for forming a precursor precipitate to contain other metal ions in a desired ratio. This can allow the precursor precipitate to contain other metals in addition to nickel, and heat-treating the precursor precipitate can yield a composite oxide having a desired composition.

The composite oxide may have an average particle diameter of, for example, from 2 μm to 30 μm, and preferably from 3 μm to 25 μm. The average particle diameter of the composite oxide is a volume mean diameter defined as a value corresponding to 50% volume accumulation from the small particle diameter side in a volume distribution measured using a laser scattering method.

In the synthesis step of synthesizing the first particles containing a lithium transition metal composite oxide, a mixture containing lithium obtained by mixing a composite oxide described above and a lithium compound may be heat-treated at a temperature of from 550° C. to 1000° C. to obtain a heat-treated product. The heat-treated product thus obtained may have a layered structure, and contain a nickel-containing lithium transition metal composite oxide.

Examples of the lithium compound to be mixed with the composite oxide include lithium hydroxide, lithium carbonate, and lithium oxide. The lithium compound to be mixed may have a particle diameter in terms of volume mean particle diameter in a range of, for example, from 0.1 μm to 100 μm, and preferably from 2 μm to 20 μm.

The ratio of the total number of moles of lithium to the total number of moles of metal elements contained in the composite oxide in the mixture is in a range of, for example, from 0.95 to 1.2. The composite oxide and the lithium compound may be mixed using, for example, a high-speed shear mixer.

The mixture may further contain other metals in addition to lithium and metal elements contained in the composite oxide. Examples of the other metal elements include Al, Si, Zr, Ti, Mg, Ta, Nb, Mo, and W, and at least one selected from the group consisting of these metal elements is preferable. When the mixture contains, for example, W, Nb, or the like as the other metal elements, it may be desirable for improvement of output characteristics. When the mixture contains, for example, Al, Zr, or the like, it may be desirable for further improvement of cycle characteristics. When the mixture contains, for example, Ti, Si, or the like, it may be desirable for further improvement of cycle characteristics under high voltage. When containing other metal elements, the mixture may be obtained by mixing metal elemental substances or metal compounds of other metals together with the composite oxide and the lithium compound. Examples of the metal compounds containing other metal elements include oxides, hydroxides, chlorides, nitrides, carbonates, sulfates, nitrates, acetates, and oxalates.

When containing other metal elements, the mixture may have a ratio of the total number of moles of metal elements contained in the composite oxide to the total number of moles of other metals in the mixture in a range of, for example, from 1:0.0001 to 1:0.1, preferably from 1:0.0005 to 1:0.03, or from 1:0.001 to 1:0.01.

The mixture may be heat-treated at a temperature in a range of, for example, from 550° C. to 1000° C., preferably from 600° C. to 950° C., and more preferably from 700° C. to 950° C. Although the mixture may be heated at a single temperature, the mixture is preferably heated at multiple temperatures in a stepwise manner to improve electrical discharge capacity at a high voltage. When heat-treated at multiple temperatures, for example, the mixture is heat-treated at a first temperature for a predetermined time, then the temperature is increased to a second temperature, and the mixture is heat-treated at the second temperature for a predetermined time. The first temperature may be, for example, from 200° C. to 600° C., and preferably from 400° C. to 500° C. The second temperature may be, for example, from 600° C. to 900° C., and preferably from 650° C. to 750° C. The heat treatment time may be, for example, 0.5 hour to 48 hours. When the mixture is heat-treated at multiple temperatures, the period for each heating may be from 0.2 hour to 47 hours.

The mixture may be heat-treated in the air or in an oxygen-containing atmosphere. The mixture may be heat-treated in, for example, a box furnace, a rotary kiln furnace, a pusher furnace, or a roller hearth kiln furnace.

The lithium transition metal composite oxide thus obtained has a composition ratio of the number of moles of nickel to the total number of moles of metals other than lithium in a range of from 0.7 to less than 1, preferably from 0.7 to 0.95, more preferably from 0.75 to 0.95, and still more preferably from 0.8 to 0.95. The lithium transition metal composite oxide may contain cobalt. When containing cobalt, the lithium transition metal composite oxide has a ratio of the number of moles of cobalt to the total number of moles of metals other than lithium in a range of, for example, more than 0 to 0.3, and preferably from 0.02 to 0.2. The lithium transition metal composite oxide may contain manganese. When containing manganese, the lithium transition metal composite oxide has a ratio of the number of moles of manganese to the total number of moles of metals other than lithium in a range of, for example, more than 0 to 0.3, preferably more than 0 to 0.15, and more preferably from 0.01 to 0.15. The lithium transition metal composite oxide may contain aluminium. When containing aluminium, the lithium transition metal composite oxide has a ratio of the number of moles of aluminium to the total number of moles of metals other than lithium in a range of, for example, more than 0 to 0.1, preferably more than 0 to 0.05, and more preferably from 0.01 to 0.04. When containing at least one of manganese and aluminium, the lithium transition metal composite oxide has a ratio of the number of moles of manganese and aluminium to the total number of moles of metals other than lithium in a range of, for example, more than 0 to 0.3, preferably more than 0 to 0.25, and more preferably from 0.01 to 0.15.

The lithium transition metal composite oxide can have a composition represented by, for example, formula (1):

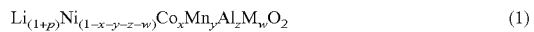

$$Li_{(1+p)}Ni_{(1-x-y-z-w)}Co_xMn_yAl_zM_wO_2 \quad (1)$$

In the formula, $-0.05 \leq p \leq 0.2$, $0 < x+y+z+w \leq 0.3$, $0 \leq x \leq 0.3$, $0 \leq y \leq 0.3$, $0 \leq z \leq 0.1$, and $0 \leq w \leq 0.03$; and M is at least one selected from the group consisting of Zr, Ti, Mg, Ta, Nb, Mo, and W.

The first particles containing the lithium transition metal composite oxide may have a volume mean particle diameter in a range of, for example, from 2 μm to 30 μm, and preferably from 3 μm to 25 μm.

Washing Step

In the washing step, the first particles containing lithium transition metal composite oxide are contacted with a solution containing sodium ions (hereinafter also referred to as a washing liquid) to obtain second particles containing the lithium transition metal composite oxide and sodium element. The product obtained through contact with the washing liquid may undergo, for example, dewatering or drying treatment as appropriate. The washing step may be to remove, for example, at least a part of alkaline component of the raw materials left unreacted in the first particles.

The solution containing sodium ions only needs to contain at least sodium ions and water. The solution containing sodium ions may be provided by, for example, dissolving a sodium salt in a solvent. Examples of the sodium salt include sodium sulfate and sodium hydroxide, and at least one selected from the group consisting of these is preferable, and a solution containing at least sodium sulfate is more preferable. The solvent may contain, for example, water alone, and may further contain a water soluble organic solvent, such as alcohol, as appropriate in addition to water. The sodium ion content of the washing liquid may be, for example, from 0.01 mol/L to 2.0 mol/L, preferably from 0.05 mol/L to 2.0 mol/L, more preferably from 0.1 mol/L to 1.5 mol/L, still more preferably from 0.15 mol/L to 1.0 mol/L, and especially preferably from 0.15 mol/L to 0.6 mol/L.

The washing liquid may contain other metal ions in addition to sodium. Examples of the metal ions other than sodium include alkali metal ions, such as lithium ions and potassium ions, and alkaline earth metal ions, such as magnesium ions. When the washing liquid contains other metal ions in addition to sodium ions, the other metal ion content of the washing liquid may be, for example, 0.1 mol/L or less, and preferably less than 0.01 mol/L.

The temperature at which the first particles and the washing liquid are contacted with each other may be, for example, in a range of from 5° C. to 60° C., and preferably from 10° C. to 40° C. The contact period may be, for example, in a range of from 1 min to 2 hours, and preferably from 5 min to 30 min. The amount of the washing liquid to be used for the contact may be, for example, in a range of from 0.25 times to 10 times, preferably 0.5 time to 4 times of the mass of the first particles.

The first particles and the washing liquid may be contacted by supplying the first particles into the washing liquid to provide a slurry. When a slurry is formed by the contact, the solid concentration of the first particles in the slurry may be, for example, in a range of from 10% by mass to 80% by mass, and preferably from 20% by mass to 60% by mass. Also, the contact may be carried out by passing the washing liquid through the first particles being held on a filter, or may be carried out by washing the first particles with, for example, pure water, dewatering the first particles to obtain a dewatered cake, and passing the washing liquid through the dewatered cake. When the contact is carried out by washing the first particles with, for example, pure water, dewatering the first particles to obtain a dewatered cake, and passing the washing liquid through the dewatered cake, the total amount of the pure water and washing liquid to be used for the contact may be, for example, in a range of from 0.25 times to 10 times, preferably 0.5 time to 4 times of the mass of the first particles. However, a solution containing sodium ions (for example, a sodium sulfate solution) dissolves residual alkaline (for example, a lithium carbonate) better than water, and thus washes residual alkaline more easily. Thus, contacting the first particles with a washing liquid is preferably carried out rather than washing with pure water in terms of reducing damage on the lithium transition metal composite oxide. It is more preferable not to perform washing with pure water.

The second particles obtained in the washing step contain a sodium-containing compound in addition to the lithium transition metal composite oxide. The sodium-containing compound may be present in, for example, the particle boundaries of the secondary particles, which are composed of the primary particles containing the lithium transition metal composite oxide. The second particles contain the sodium-containing compound in an amount in a range of, for example, from 100 ppm to 1400 ppm, preferably from 150 ppm to 1300 ppm, more preferably from 150 ppm to 1200 ppm, still more preferably from 200 ppm to 1000 ppm, and particularly preferably from 300 ppm to 1000 ppm in terms of sodium element. When the amount of the sodium-containing compound is within the above-described range, the resistance component during electrical charge and discharge is sufficiently reduced. The ratio of the sodium-containing compound in the second particles may be adjusted by, for example, adjusting the sodium ion concentration of the washing liquid, and the amount of water adhered to the dewatered cake.

The second particles obtained in the washing step can undergo drying treatment. In the drying treatment, it suffices that at least partially remove water adhered to the second particles. This may be carried out by, for example, heat drying, air drying, and vacuum drying. The drying temperature during heat drying is sufficient if water contained in the second particles is adequately removed. The drying temperature is, for example, from 80° C. to 300° C., and preferably from 100° C. to 250° C. When the drying temperature is within this range, elution of lithium into the adhered water can sufficiently be reduced. Also, this can reduce crystal structure disintegration on the particle surfaces, and inhibit lowering of the electrical charge-discharge capacity sufficiently. The drying time may be appropriately selected in accordance with the amount of water contained in the second particles. The drying time is, for example, from 1 hour to 10 hours. The amount of water contained in the second particles after drying treatment is, for example, 0.2% by mass or less, and preferably 0.1% by mass or less.

The degree of washing in the washing step may be checked by the lithium content, residual alkaline component, and specific surface area of the second particles. In general, when the second particles have a small specific surface area, for example, particle cracking and elution of elements from the lithium and the composite oxide can be sufficiently reduced. This may improve cycle characteristics. Also, when the second particles have a certain size of specific surface area, the residual alkaline component can be sufficiently reduced. An aqueous solution of sodium salt, such as sodium sulfate, as a washing liquid can dissolve lithium salt better than, for example, pure water or an aqueous solution of lithium salt, and thus needs a less amount of liquid for removing alkaline. As a result, the second particles have a smaller specific surface area, which can reduce excessive elution of lithium from the second particles.

The second particles obtained from the washing step have a specific surface area in a range of, for example, from 0.5 $m^2/g$ to 4 $m^2/g$, preferably from 1.0 $m^2/g$ to 3.0 $m^2/g$, more preferably from 1.0 $m^2/g$ to 1.6 $m^2/g$, and still more preferably from 1.0 $m^2/g$ to 1.4 $m^2/g$. The specific surface area may be measured by the BET method.

Mixing Step

In the mixing step, the second particles and a boron compound are mixed to obtain a mixture. The mixing of the second particles and a boron compound may be carried out either by a dry or wet method. The mixing of the second particles may be carried out by using, for example, a super mixer. In the mixing step, the second particles may be mixed with elemental substances, alloy or metal compound of other metal element in addition to a boron compound. The other element includes Al, Si, Zr, Ti, Mg, Ta, Nb, Mo, and W, and at least one selected from the group consisting of these metal elements is preferable.

The boron compound may be at least one selected from the group consisting of boron oxides, boron oxo acid, and boron oxo acid salt. More specific examples of the boron compound include lithium tetraborate ($Li_2B_4O_7$), ammonium pentaborate ($NH_4B_5O_8$), orthoboric acid ($H_3BO_3$, or ordinary boric acid), lithium metaborate ($LiBO_2$), and boron oxide ($B_2O_3$), and at least one selected from the group consisting of these is preferable. Among these examples, orthoboric acid is more preferable from the aspect of cost.

The boron compound may be mixed in a solid state or in the form of a solution with the second particles. When used in a solid state, the boron compound has a volume mean particle diameter of, for example, from 1 μm to 60 μm, and preferably from 10 μm to 30 μm.

The mixture has a boron compound content, as a percentage of the number of moles of boron element to the total number of moles of metals other than lithium in the lithium transition metal composite oxide, of, for example, from 0.1% by mole to 2% by mole, preferably from 0.1% by mole to 1.5% by mole, and more preferably from 0.1% by mole to 1.2% by mole.

Heat Treatment Step

In the heat-treatment step, the mixture is heat-treated, for example, at a temperature in a range of from 100° C. to 450° C. to obtain a positive electrode active material. The heat-treating temperature may be in a range of from 200° C. to 400° C., preferably from 220° C. to 350° C., and more preferably from 250° C. to 350° C. The heat-treating temperature set higher than the drying treatment temperature may further improve electrical charge-discharge capacity. The heat-treating atmosphere can be an oxygen-containing atmosphere or the air. The heat-treating time is, for example, from 1 hour to 20 hours, and preferably from 5 hours to 10 hours. The heat-treated product obtained through the heat-treatment step may undergo, for example, crushing treatment and classifying treatment.

The second particles after the washing step may have a lithium-deficient region near the surfaces. In the lithium-deficient region, desorption and insertion of lithium ions may be inhibited. However, mixing a boron compound with the second particles after the washing step, and heat-treating the mixture can be believed to compensate such lithium deficit, reduce inhibition of desorption and insertion of lithium ions, and improve electrical charge and discharge characteristics and cycle characteristics.

Positive Electrode Active Material

The positive electrode active material may contain secondary particles being composed of a plurality of primary particles containing a lithium transition metal composite oxide having a layered structure and a composition ratio of the number of moles of nickel to the total number of moles of metals other than lithium in a range of from 0.7 to less than 1. A compound containing boron may be attached on at least a part of the surfaces of the primary particles. A compound containing sodium may be present in at least a part of the particle boundaries of the secondary particles. A value ($\sigma 1/t1$), or a coefficient of variation (CV), obtained by dividing a standard deviation $\sigma 1$ of detection amounts of boron element in any three regions in a cross-sectional surface of the secondary particles by an average $t1$ of the detection amounts is less than 0.18.

The positive electrode active material contains the secondary particles being composed of a plurality of the primary particles. The primary particles contain lithium transition metal composite oxide and has a structure on the surfaces of which a compound containing boron is attached. This composition enables a non-aqueous electrolyte secondary battery containing the positive electrode active material to have improved electrical charge and discharge characteristics and cycle characteristics. Also, a compound containing sodium in the particle boundaries of the secondary particle allows the compound containing boron to be uniformly dispersed across the secondary particles. This structure is believed to achieve good electrical charge and discharge characteristics and cycle characteristics. The positive electrode active material can be efficiently produced by the method of producing a positive electrode active material described above.

The coefficient of variation in detection amounts of boron element on a cross-sectional surface of the positive electrode active material particles is preferably less than 0.18, more preferably 0.15 or less, still more preferably 0.14 or less, and particularly preferably 0.13 or less. The lower limit of the coefficient of variation is, for example, 0.04 or more. The coefficient of variation in detection amounts of boron element being the predetermined value or less is believed to indicate that the boron compound is uniformly dispersed across the positive electrode active material particles.

An average of detection amounts of boron element to be used for the calculation of the coefficient of variation is obtained by selecting any three regions in any cross-sectional surface of the secondary particles contained in the positive electrode active material, and calculating an arithmetic mean of the detection amounts in the selected regions. A standard deviation of the detection amounts of boron element is calculated from the average and the detection amounts in the regions. The detection amounts of boron element on a cross-sectional surface of the positive electrode active material particles may be measured by using, for example, secondary ion mass spectrometer (SIMS).

The regions from which boron element is to be detected may be selected from, for example, a region near the surface (surface section), a region near the center (center section), and a region between the surface section and the center section (middle section) in a cross-sectional surface of the positive electrode active material particles. Alternatively, multiple regions may be selected from each of the surface section, the middle section, and the center section, and an arithmetic mean of the detection amounts in the respective multiple regions may be used as the detection amount of each of the three regions.

The lithium transition metal composite oxide in the primary particles has a composition ratio of the number of moles of nickel to the total number of moles of metals other than lithium of from 0.7 to less than 1, preferably from 0.7 to 0.95, more preferably from 0.8 to 0.95, and still more preferably from 0.9 to 0.95. A positive electrode active material containing a lithium transition metal composite oxide having a greater ratio of the number of moles of nickel can achieve good electrical charge and discharge characteristics and cycle characteristics. The composition of the lithium transition metal composite oxide may be determined using, for example, an inductively coupled plasma atomic emission spectrometer.

The lithium transition metal composite oxide may contain cobalt in its composition. When containing cobalt, the lithium transition metal composite oxide has a ratio of the number of moles of cobalt to the total number of moles of metals other than lithium of, for example, from more than 0 to 0.3, and preferably from 0.02 to 0.2. The lithium transition metal composite oxide may contain manganese. When containing manganese, the lithium transition metal composite oxide has a ratio of the number of moles of manganese to the total number of moles of metals other than lithium of, for example, from more than 0 to 0.3, and preferably from more than 0 to 0.15. The lithium transition metal composite oxide may contain aluminium. When containing aluminium, the lithium transition metal composite oxide has a ratio of the number of moles of aluminium to the total number of moles of metals other than lithium of, for example, from more than 0 to 0.1, preferably from more than 0 to 0.05, and more preferably from 0.01 to 0.04.

When the lithium transition metal composite oxide contains nickel, cobalt, and at least one of manganese and aluminium, the ratio of nickel, cobalt, manganese and aluminium, Ni/Co/(Mn+Al), may be set to, for example, 8/1/1 or 8/1/(0.5+0.5) on a molar basis.

The lithium transition metal composite oxide may have a composition represented by, for example, formula (1):

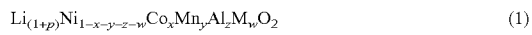

$$Li_{(1+p)}Ni_{1-x-y-z-w}Co_xMn_yAl_zM_wO_2 \quad (1)$$

In the formula, $-0.05 \le p \le 0.2$, $0 < x+y+z+w \le 0.3$, $0 \le x \le 0.3$, $0 \le y \le 0.3$, $0 \le z \le 0.1$, and $0 \le w \le 0.03$; and M is at least one selected from the group consisting of Zr, Ti, Mg, Ta, Nb, Mo, and W.

In the formula (1), in view of output characteristics, p is preferably −0.02 or more, or 0.02 or more, and p is also preferably 0.12 or less, or 0.06 or less. "x" is preferably from more than 0 to 0.3, and more preferably from 0.02 to 0.2. "y" is preferably from more than 0 to 0.3, and more preferably from more than 0 to 0.15. "z" is preferably from more than 0 to 0.1, more preferably from more than 0 to 0.05, and still more preferably from 0.01 to 0.04.

A compound containing boron is attached on at least a part of the surfaces of the primary particles. An example of the boron-containing compound is lithium metaborate ($LiBO_2$). The boron-containing compound may form a complex with the lithium transition metal composite oxide. The amount of the boron-containing compound in the positive electrode active material is, for example, from 0.1% by mole to 2% by mole, and preferably from 0.1% by mole to 1.5% by mole in terms of a ratio of the number of moles of boron element to the total number of moles of metals other than lithium in the lithium transition metal composite oxide. The amount of boron in the positive electrode active material may be measured using, for example, an inductively coupled plasma atomic emission spectrometer.

A compound containing sodium is present in at least a part of the particle boundaries of the secondary particles. An example of the sodium-containing compound includes sodium sulfate ($Na_2SO_4$). The amount of the sodium-containing compound in the positive electrode active material is, for example, in a range of from 100 ppm to 1400 ppm, preferably from 150 ppm to 1300 ppm, more preferably from 150 ppm to 1200 ppm, still more preferably 200 ppm to 1000 ppm, and particularly preferably from 300 ppm to 1000 ppm in terms of sodium element. The amount of sodium element in the positive electrode active material may be measured using, for example, an inductively coupled plasma atomic emission spectrometer.

The specific surface area of the positive electrode active material is, for example, in a range of from 0.2 $m^2/g$ to 3.0 $m^2/g$, and preferably from 0.3 $m^2/g$ to 2.0 $m^2/g$. The specific surface area of the positive electrode active material may be measured by BET method.

The positive electrode active material when used in a positive electrode of a non-aqueous electrolyte secondary battery, can contribute to achieve good cycle characteristics of the battery. The positive electrode active material is to be contained in a positive electrode active material layer arranged on the current collector of a positive electrode. In other words, the present disclosure encompasses an electrode containing the positive electrode active material for a non-aqueous electrolyte secondary battery, and a non-aqueous electrolyte secondary battery including the electrode.

Electrode for Non-Aqueous Electrolyte Secondary Battery

The electrode for a non-aqueous electrolyte secondary battery may include a current collector and a positive electrode active material layer arranged on the current collector, the positive electrode active material layer containing the positive electrode active material described above or the positive electrode active material produced by the production method described above. A non-aqueous electrolyte secondary battery including the electrode may exhibit good cycle characteristics.

A density of the positive electrode active material layer may be, for example, in a range of from 2.6 $g/cm^3$ to 3.9 $g/cm^3$, preferably from 2.8 $g/cm^3$ to 3.8 $g/cm^3$, more preferably from 3.1 $g/cm^3$ to 3.7 $g/cm^3$, and still preferably from 3.2 $g/cm^3$ to 3.6 $g/cm^3$. The density of the positive electrode active material layer may be calculated by dividing the mass of the active material layer by the volume of the active material layer. Here, the density of the positive electrode active material layer may be adjusted by applying pressure after applying an electrode composition described later on the current collector.

Examples of the material for the current collector include aluminum, nickel, and stainless steel. The positive electrode active material layer may be formed by mixing the positive electrode active material, a conductive material, a binder, and so forth with a solvent to obtain an electrode composition, applying the electrode composition on the current collector, and drying and pressurizing the composition. Examples of the conductive material include natural graphite, artificial graphite, and acetylene black. Examples of the binder include polyvinylidene difluoride, polytetrafluoroethylene, and polyamide acrylic resin. Examples of the solvent include N-methyl-2-pyrrolidone (NMP).

Non-Aqueous Electrolyte Secondary Battery

The non-aqueous electrolyte secondary battery includes the electrode for a non-aqueous electrolyte secondary battery. The non-aqueous electrolyte secondary battery includes, in addition to the electrode for a non-aqueous electrolyte secondary battery, a negative electrode for a non-aqueous secondary battery, a non-aqueous electrolyte, and a separator. For the negative electrode, the non-aqueous electrolyte, the separator, and so forth to be included in the non-aqueous electrolyte secondary battery, those for a non-aqueous electrolyte secondary battery described, for example, in Japanese Patent Application Publications No. 2002-075367, No. 2011-146390, and No. 2006-12433, which are incorporated in their entirety in the present specification, may be used as appropriate.

EXAMPLES

Examples of the present invention will now be described; however, the present invention is not limited to these Examples. A volume mean diameter is a value corresponding to 50% volume accumulation from the small particle diameter side in a volume distribution obtained using a laser scattering method. Specifically, a laser diffraction particle size dispersion analyzer (Mastersizer 2000 by Malvern) was used to measure volume mean particle diameters. Specific surface areas were measured by the gaseous nitrogen adsorption method (one-point method) using a BET specific surface area measuring device (Macsorb by Mountek). Alkaline components were measured by adding the positive electrode active material to pure water, and titrating eluted lithium with sulfuric acid until a second point of neutralization is reached. The amount of alkaline component neutralized with sulfuric acid was determined as the amount of lithium hydroxide (LiOH). The composition was measured using an inductively coupled plasma atomic emission spectrometer (ICP-AES by PerkinElmer). The amount of sulfuric acid was measured using an inductively coupled plasma atomic emission spectroscopy (ICP-AES by Hitachi). The amount of sodium (amount of Na) was measured using an atomic absorption spectrometer (AAS by Hitachi).

Example 1

Precursor Provision Step

Composite oxide particles having a composition represented by $(Ni_{0.95}Co_{0.05})O_3$ and a volume mean particle diameter of the secondary particles of 20 μm was obtained by the coprecipitation method.

Synthesis Step

The resultant composite oxide particles, lithium hydroxide, and aluminum hydroxide were mixed in a molar ratio of Li:(Ni+Co):Al=1.10:0.97:0.03 to obtain a raw material mixture. The resultant raw material mixture was heat-treated in the air at a first temperature of 450° C. for 3 hours, and at a second temperature of 680° C. for 4 hours. After heat-treatment, the mixture underwent dispersion treatment to obtain first particles containing the lithium transition metal composite oxide with a composition represented by $Li_{1.03}Ni_{0.92}Co_{0.05}Al_{0.03}O_2$.

Washing Step

The resultant first particles were added to an aqueous solution of sodium sulfate with a sodium ion concentration of 0.469 mol/L to obtain a slurry with a solid concentration of 45% by mass. The solid concentration was obtained by: the mass of the first particles/(the mass of the first particles+ the mass of the washing liquid). The slurry was stirred for 30 min, dewatered through a funnel, and separated as a cake. The separated cake was dried at 150° C. for 10 hours to obtain second particles as washed particles.

Mixing Step

To the resultant second particles, orthoboric acid was added in an amount of 1% by mole in terms of boron element relative to the total number of moles of metals other than lithium in the lithium transition metal composite oxide contained in the second particles, and mixed to obtain a mixture.

Heat Treatment Step

The resultant mixture was heat-treated at 250° C. for 10 hours in the air to obtain a positive electrode active material E1 containing a target lithium transition metal composite oxide.

Example 2

A positive electrode active material E2 was obtained in the same or a similar manner as in Example 1 except that the aqueous solution of sodium sulfate in the washing step was replaced with an aqueous solution of sodium sulfate with a sodium ion concentration of 0.156 mol/L.

Example 3

A positive electrode active material E3 was obtained in the same or a similar manner as in Example 1 except that an aqueous solution of sodium hydroxide was used in place of the aqueous solution of sodium sulfate in the washing step.

Comparative Example 1

A positive electrode active material C1 was obtained in the same or a similar manner as in Example 1 except that pure water was used in place of the aqueous solution of sodium sulfate in the washing step, and that the solid concentration of the slurry was changed to 42% by mass.

Comparative Example 2

A positive electrode active material C2 was obtained in the same or a similar manner as in Example 1 except that an aqueous solution of lithium sulfate with a lithium ion concentration of 0.469 mol/L was used in place of the aqueous solution of sodium sulfate in the washing step, and that the solid concentration of the slurry was changed to 32% by mass.

Cycle Characteristics Evaluation 1

The positive electrode active materials obtained in Examples 1 to 3 and Comparative Examples 1 and 2 were evaluated for cycle characteristics as described below.

Provision of Positive Electrode 96.5 parts by mass of the positive electrode active material, 65 parts by mass of Super-C (by Timical), and 2 parts by mass of polyvinylidene difluoride (PVDF) were dispersed and dissolved in N-methyl-2-pyrrolidone (NMP) to provide a positive electrode slurry. The positive electrode slurry was applied on an aluminium foil current collector, and dried. After drying, a positive electrode was obtained by compression molding with a roll press machine so that the density of the positive electrode active material layer was 3.5 g/cm$^3$, and cutting into a size of 15 cm$^2$.

Provision of Non-Aqueous Electrolyte

Ethylene carbonate (EC), dimethyl carbonate (DMC), and ethyl methyl carbonate (EMC) were mixed in a volume ratio of 3:4:3 to obtain a mixed solvent. Into the mixed solvent, lithium hexafluorophosphate (LiPF$_6$) was dissolved at a concentration of 1 mol/L to obtain a non-aqueous electrolyte.

Fabrication of Battery for Evaluation

To the current collector of the positive electrode, a lead electrode was connected, and then vacuum-dried at 120° C. A separator formed from porous polyethylene was arranged to cover the positive electrode in a dry box, and packed in a laminated pouch pack. After packing, the pouch pack was vacuum-dried at 60° C. to remove moisture adsorbed on the members. After vacuum drying, an Li foil adhered to a SUS plate in an argon box and the current collector of the positive electrode covered by the separator were arranged in a manner to face each other, and placed into the laminated pouch pack. The non-aqueous electrolyte described above was introduced into the laminated pouch pack, and the pouch pack was sealed to obtain a laminated non-aqueous electrolyte secondary battery as a battery for evaluation.

Aging

The resultant battery for evaluation was electrically charged and discharged once by constant-voltage/constant-current charging at a charge voltage of 4.25 V (counter electrode: Li) and a charge current of 0.2 C (1 C≡a current at which discharge is completed in one hour), and constant current discharging at a discharge voltage of 2.75 V (counter electrode: Li) and a discharge current of 0.2 C.

Capacity Maintenance Measurement

After aging, discharge capacity after each cycle of n cycles was measured at a constant temperature of 45° C. where one cycle consists of constant-voltage/constant-current charging at a charge voltage of 4.25 V (counter electrode: Li) and a charge current of 0.3 C, and constant current discharging at a discharge voltage of 2.75 V (counter electrode: Li) and a discharge current of 0.3 C. The capacity maintenance rate after n cycles Rs(n) expressed as a ratio=Ed(n)/Ed(1) where Ed(n) is a discharge capacity after n cycles, and Ed(1) is a discharge capacity after one cycle was calculated with the number of cycles n=30. The evaluation results are shown in Table 1.

TABLE 1

| | Fabrication requirements | | | | | | | Specific | | | | |
|---|---|---|---|---|---|---|---|---|---|---|---|---|
| | Composition | | | | Orthoboric acid | Washing liquid | | surface area of second particle | LiOH content | Sulfuric acid content | Na content | Capacity maintenance ratio (%) |
| | | | | | | | Na+ concentration | Slurry concentration | | | | |
| | Li | Ni | Co | Al | (mol %) | Solute | (mol/L) | (mass %) | (m²/g) | (mass %) | (mass %) | (ppm) | |
| Example 1 | 1.03 | 0.92 | 0.05 | 0.03 | 1.0 | Sodium sulfate | 0.469 | 45 | 1.31 | 0.52 | 0.20 | 710 | 93 |
| Example 2 | 1.03 | 0.92 | 0.05 | 0.03 | 1.0 | Sodium sulfate | 0.156 | 45 | 1.51 | 0.57 | 0.11 | 230 | 91 |
| Example 3 | 1.03 | 0.92 | 0.05 | 0.03 | 1.0 | Sodium hydroxide | 0.469 | 45 | 1.34 | 0.47 | 0.06 | 980 | 97 |
| Comaparative Example 1 | 1.03 | 0.92 | 0.05 | 0.03 | 1.0 | — | — | 42 | 1.80 | 0.56 | 0.07 | 20 | 83 |
| Comaparative Example 2 | 1.03 | 0.92 | 0.05 | 0.03 | 1.0 | Lithium sulfate | — | 32 | 1.49 | 0.61 | 0.19 | 20 | 87 |

Table 1 shows the evaluation results of the batteries for evaluation containing the positive electrode active materials E1 to E3 of Examples 1 to 3. These batteries were provided by the steps of washing with an aqueous solution of sodium salt, mixing a boron compound, and heat-treating the mixture. These batteries had evaluation results of good cycle characteristics. In contrast, the secondary particles of the positive electrode active material C1 of Comparative Example 1 had a large specific surface area. This is seemingly partly attributable to washing with pure water. The battery for evaluation containing the positive electrode active material C1 showed a low capacity maintenance rate and poor battery performance. The secondary particles of the positive electrode active material C2 of Comparative Example 2 had a smaller specific surface area than Comparative Example 1. This is seemingly partly attributable to washing with an aqueous solution of lithium sulfate. The battery for evaluation containing the positive electrode active material C2 showed a low capacity maintenance rate and poor battery performance.

Example 4

Precursor Provision Step

Composite oxide particles having a volume mean particle diameter of 18 μm, and a composition represented by $(Ni_{0.85}Co_{0.15})O_3$ was obtained by the coprecipitation method.

Synthesis Step

First particles were obtained in the same or a similar manner as in Example 1 except that the mixing ratio in the synthesis step was changed to Li:(Ni+Co):Al=1.10:0.96:0.04 and that the second temperature was changed to 745° C.

Washing Step

Second particles were obtained in the same or a similar manner as in Example 1 except that the aqueous solution of sodium sulfate in the washing step was replaced with an aqueous solution of sodium sulfate with a sodium ion concentration of 0.313 mol/L, and that the solid concentration of the slurry was changed to 40% by mass.

Mixing Step

A positive electrode active material E4 was obtained in the same or a similar manner as in Example 1 except that the amount of boron added in the mixing step was changed to 0.3% by mole in terms of boron element relative to the total number of moles of metals other than lithium in the lithium transition metal composite oxide contained in the second particles.

Comparative Example 3

The positive electrode active material C3 was obtained in the same or a similar manner as in Example 4 except that pure water was used in place of the aqueous solution of sodium sulfate used in the washing step, and that the solid concentration of the slurry was changed to 45% by mass.

Comparative Example 4

The positive electrode active material C4 was obtained in the same or a similar manner as in Example 4 except that an aqueous solution of lithium sulfate with a lithium ion concentration of 0.313 mol/L was used in place of the aqueous solution of sodium sulfate used in the washing step.

Each of the positive electrode active materials obtained in Example 4 and Comparative Examples 3 and 4 were evaluated in the same or a similar manner as in Cycle Characteristics Evaluation 1. The evaluation results are shown in Table 2.

TABLE 2

| | Fabrication requirements | | | | | | | Specific surface area of second particle ($m^2/g$) | LiOH content (mass %) | Sulfuric acid content (mass %) | Na content (ppm) | Capacity maintenance ratio (%) |
|---|---|---|---|---|---|---|---|---|---|---|---|---|
| | Composition | | | | Orthoboric acid (mol %) | Washing liquid | | | | | | |
| | Li | Ni | Co | Al | | Solute | $Na^+$ concentration (mol/L) | Slurry concentration (mass %) | | | | | |
| Example 4 | 1.02 | 0.82 | 0.14 | 0.04 | 0.3 | Sodium sulfate | 0.313 | 40 | 1.08 | 0.28 | 0.14 | 350 | 96 |
| Comaparative Example 3 | 1.02 | 0.82 | 0.14 | 0.04 | | — | — | 45 | 1.51 | 0.27 | 0.07 | 30 | 90 |
| Comaparative Example 4 | 1.02 | 0.82 | 0.14 | 0.04 | | Lithium sulfate | — | 40 | 1.15 | 0.30 | 0.15 | 30 | 89 |

As shown in Table 2, the batteries for evaluation containing the positive electrode active materials C3 and C4 of Comparative Examples 3 and 4 showed a lower capacity maintenance rate and poorer battery performance than the battery for evaluation containing the positive electrode active material E4 of Example 4, which was washed with an aqueous solution of sodium salt.

Example 5

Precursor Provision Step

Composite oxide particles having a composition represented by $(Ni_{0.88}Co_{0.09}Mn_{0.03})O_3$ and a volume mean particle diameter of 22 μm were obtained by the coprecipitation method.

Synthesis Step

First particles were obtained in the same or a similar manner as in Example 1 except that the mixing ratio in the synthesis step was changed to Li:(Ni+Co+Mn):Al=1.12:0.98:0.02, and that the second temperature was changed to 730° C.

Washing Step

Second particles were obtained by washing the first particles with an aqueous solution of sodium sulfate with a sodium ion concentration of 0.469 mol/L in the same or a similar manner as in Example 1.

Mixing Step

A mixture was obtained in the same or a similar manner as in Example 1 except that the amount of boron added in the mixing step was changed to 0.5% by mole in terms of boron element relative to the total number of moles of metals other than lithium of the lithium transition metal composite oxide contained in the second particles, and that tungsten oxide was added in an amount of 0.3% by mole relative to the total number of moles of metals other than lithium in the lithium transition metal composite oxide contained in the second particles.

Heat Treatment Step

A positive electrode active material E5 was obtained by heat-treating the mixture in the same or a similar manner as in Example 1.

Comparative Example 5

A positive electrode active material C5 was obtained in the same or a similar manner as in Example 5 except that pure water was used in place of the aqueous solution of sodium sulfate in the washing step, and that the solid concentration of the slurry was changed to 37% by mass.

Comparative Example 6

A positive electrode active material C6 was obtained in the same or a similar manner as in Example 5 except that an aqueous solution of lithium sulfate with a lithium ion concentration of 0.469 mol/L was used in place of the aqueous solution of sodium sulfate used in the washing step, and that the solid concentration of the slurry was changed to 28% by mass.

Cycle Characteristics Evaluation 2

The positive electrode active materials obtained in Example 5 and Comparative Examples 5 and 6 were evaluated for cycle characteristics as described below.

Provision of Positive Electrode Active Material

A positive electrode active material A containing a lithium transition metal composite oxide having a composition represented by $Li_{1.03}Ni_{0.835}Co_{0.14}Al_{0.025}O_2$ and a volume mean particle diameter of 4.5 μm, and obtained through the washing step with an aqueous solution of sodium sulfate was provided. The positive electrode active materials E5, C5, and C6 obtained in Example 5 and Comparative Examples 5 and 6 were each mixed with the positive electrode active material A in a weight ratio of 7:3 to provide a mixed positive electrode active material for evaluation.

Fabrication of Positive Electrode 92 parts by mass of each of the mixed positive electrode active materials obtained above description, 3 parts by mass of acetylene black, and 5 parts by mass of polyvinylidene difluoride (PVDF) were dispersed and dissolved in N-methyl-2-pyrrolidone (NMP) to provide a positive electrode slurry. The resultant positive electrode slurry was applied to an aluminium foil current collector and dried. After drying, a positive electrode was obtained by compression molding with a roll press machine so that the density of the positive electrode active material layer was 3.5 $g/cm^3$, and cutting into a size of 15 $cm^2$.

Fabrication of Negative Electrode 97.5 parts by mass of artificial graphite, 1.5 parts by mass of carboxymethyl cellulose (CMC), and 1.0 part by mass of styrene-butadiene rubber (SBR) were dispersed in water to provide a negative electrode slurry. The resultant negative electrode slurry was applied on a copper foil, dried, and further compression-molded to obtain a negative electrode.

Provision of Non-Aqueous Electrolyte

Ethylene carbonate (EC) and ethyl methyl carbonate (EMC) were mixed in a volume ratio of 3:7 to obtain a mixed solvent. Into the mixed solvent, lithium hexafluorophosphate ($LiPF_6$) was dissolved at a concentration of 1 mol/L to obtain a non-aqueous electrolyte.

Fabrication of Battery for Evaluation

Batteries for evaluation were fabricated in the same or a similar manner as in Cycle Characteristics Evaluation 1. Specifically, lead electrodes were attached to the positive and negative electrode current collectors, respectively, and then vacuum drying was performed at 120° C. Subsequently, the separator was placed between the positive electrode and the negative electrode, and they were stored into the laminated pouch pack. After the storage, it was vacuum dried at 60° C. to remove the water adsorbed on each member. After vacuum drying, the non-aqueous electrolyte was introduced into the laminated pouch pack, and the pouch pack was sealed to have a laminated non-aqueous electrolyte secondary battery as a battery for evaluation.

Aging

The resultant batteries for evaluation were charged and discharged once by constant-voltage/constant-current charging at a charge voltage of 4.2 V (counter electrode C) and a charge current of 0.1 C, and constant current discharging at a discharge voltage of, 2.75 V (counter electrode C) and a discharge current of 0.2 C. Subsequently, the charge current was changed to 0.2 C, and charge and discharge was carried out twice to apply the non-aqueous electrolyte on the positive and negative electrodes well.

Discharge capacity maintenance rate was measured in the same or a similar manner as in Cycle Characteristics Evaluation 1 except that the charge voltage was changed to 4.2 V (counter electrode C), that the discharge voltage was changed to 2.75 V (counter electrode C), and that the cycle number was changed to n=100. The evaluation results are shown in Table 3.

Figure 2:
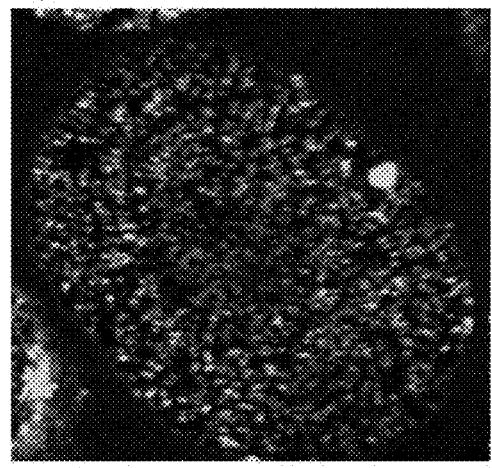
FIG. 2 is an example image showing $BO^{2-}$ dispersion of a positive electrode active material particle of Comparative Example 5.
Figure 3:
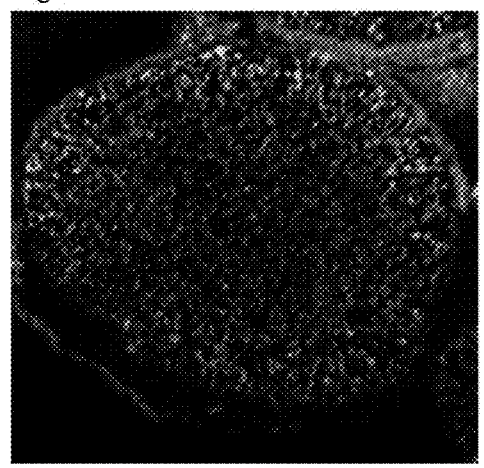
FIG. 3 is an example image showing $BO^{2-}$ dispersion of a positive electrode active material particle of Comparative Example 6.

1 hour. The detection amount of each element in each cross-sectional surface of the positive electrode active material particles of the cross-sectional surface samples was measured using a double-focusing magnetic-sector mass analyzer (NanoSIMS 50L by Cameca). Using $Cs^+$ primary ion species and a primary acceleration voltage of 8 kV, signals of $BO^{2-}$ which is a secondary ion (mass number 42.97) were measured by applying −8 kV onto the stage, and irradiating the samples with $Cs^+$. Based on the intensity of the measured signals, cross-sectional surface images were produced. FIG. 1 is an example image showing $BO^{2-}$ dispersion in a positive electrode active material particle of Example 5. FIG. 2 is an example image showing $BO^{2-}$ dispersion of a positive electrode active material particle of Comparative Example 5. FIG. 3 is an example image showing $BO^{2-}$ dispersion of a positive electrode active material particle of Comparative Example 6.

From the image data, the amounts of $BO^{2-}$ detected in the area near the surface of the particles (surface section), the area in the middle part of the particles (middle section), and the area around the center section of the particles (center section) were analytically calculated using an image analysis software (OpenMIMS ImageJ Plugin). The analysis was conducted by choosing two regions of the surface section, two regions of the middle section, and two regions of the center section for three particles from each of the positive electrode active material particles of Examples and Comparative Examples. Each of the regions was selected in a manner approximately symmetrical to one another on a line crossing the cross-sectional surface with respect to the center of a particle, each region having an area of about $1.5 \times 10^{-11}$ $m^2$. The two regions in the center section were selected as one continuous region. For the detection amounts of $BO^{2-}$ on the surface section and the middle section, an arithmetic mean of the respective two regions were obtained. An arithmetic mean value t1, a standard deviation σ1, and a coefficient of variation (CV: σ1/t1) were calculated from the resultant detection amounts for the detection amounts of $BO^{2-}$ in the three regions, or the surface section, the middle section and the center section, inside the particles of the positive electrode active materials. The standard deviation σ1 was calculated using STDEV.P function of EXCEL. For

TABLE 3

| | Fabrication requirements | | | | | | | |
|---|---|---|---|---|---|---|---|---|
| | Composition | | | | | Tungsten | Orthoboric | Washing liquid |
| | Li | Ni | Co | Mn | Al | oxide (mol %) | acid (mol %) | Solute |
| Example 5 | 1.04 | 0.86 | 0.09 | 0.03 | 0.02 | 0.3 | 0.5 | Sodium sulfate |
| Comaparative Example 5 | 1.03 | 0.86 | 0.09 | 0.03 | 0.02 | | | — |
| Comaparative Example 6 | 1.04 | 0.86 | 0.09 | 0.03 | 0.02 | | | Lithium sulfate |

| | Fabrication requirements | | Specific | | | | | |
|---|---|---|---|---|---|---|---|---|
| | Washing liquid $Na^+$ concentration (mol/L) | Slurry concentration (mass %) | surface area of second particle ($m^2/g$) | LiOH content (mass %) | Sulfuric acid content (mass %) | Na content (ppm) | Capacity maintenance ratio (%) | |
| Example 5 | 0.469 | 45 | 1.17 | 0.31 | 0.14 | 710 | 94 | |
| Comaparative Example 5 | — | 37 | 1.47 | 0.34 | 0.04 | 20 | 90 | |
| Comaparative Example 6 | — | 28 | 1.22 | 0.38 | 0.20 | 20 | 92 | |

Evaluation of Boron Element Dispersion

The positive electrode active materials obtained in Example 5 and Comparative Examples 5 and 6 were evaluated for boron element-dispersion inside the particles. Specifically, positive electrodes were each fabricated in the same or a similar manner as described above, and the positive electrodes were processed in a vacuum condition using an ion milling device (IM400 Plus by Hitachi) to obtain a cross-sectional surface sample for each of some of the positive electrode active material particles. For the processing, Ar beam was used, and the processing time was each coefficient of variation CV, an arithmetic mean of the three particles of each of Examples and Comparative Examples were obtained, and the results are shown in Table 4. These results were deemed as boron element-dispersion, and used for evaluation.

TABLE 4

|  | σ1/t1 |
| --- | --- |
| Example 5 | 0.12 |
| Comparative Example 5 | 0.18 |
| Comparative Example 6 | 0.21 |

As shown in Tables 3 and 4, the positive electrode active materials of Comparative Examples 5 and 6 had a lower capacity maintenance rate and poorer battery performance than the positive electrode active material of Example 5, which was washed with an aqueous solution of sodium salt. Also, the compound containing boron was less uniformly dispersed inside the particles of the positive electrode active materials of Comparative Examples 5 and 6 than the positive electrode active material of Example 5. This is seemingly partly attributable to the absence of sodium in the particle boundaries of the positive electrode active material particles in the comparative examples.

Example 6

Precursor Provision Step

Composite oxide particles represented by $(Ni_{0.885}Co_{0.115})O_3$ and having a volume mean particle diameter of 4 μm were obtained by the coprecipitation method.

Synthesis Step

Primary particles were obtained in the same or a similar manner as in Example 1 except that the mixing ratio in the synthesis step was changed to Li:(Ni+Co):Al=1.10:0.97:0.03, and that the second temperature was changed to 690° C.

Washing Step

Second particles were obtained in the same or a similar manner as in Example 1 except that the aqueous solution of sodium sulfate in the washing step was replaced with an aqueous solution of sodium sulfate with a sodium ion concentration of 0.156 mol/L.

Mixing Step

A positive electrode active material E6 was obtained in the same or a similar manner as in Example 1 except that the amount of boron added in the mixing step was changed to 0.1% by mole in terms of boron element relative to the total number of moles of metals other than lithium in the lithium transition metal composite oxide contained in the second particles.

Comparative Example 7

A positive electrode active material C7 was obtained in the same or a similar manner as in Example 6 except that an aqueous solution of lithium sulfate with a lithium ion concentration of 0.156 mol/L was used in place of the aqueous solution of sodium sulfate used in the washing step, and that the solid concentration of the slurry was changed to 30% by mass.

The positive electrode active materials obtained in Example 6 and Comparative Example 7 were evaluated for cycle characteristics as described below.

A positive electrode active material B was provided which contained a lithium transition metal composite oxide having a composition represented by $Li_{1.03}Ni_{0.86}Co_{0.09}Mn_{0.03}Al_{0.02}O_2$ and a volume mean particle diameter of 22 μm, and was obtained through washing step with an aqueous solution of sodium sulfate was provided.

The positive electrode active materials E6 and C7 obtained in Example 6 and Comparative Example 7 were each mixed with the positive electrode active material B in a weight ratio of 3:7 to provide mixed positive electrode active materials for evaluation, and the mixed positive electrode active materials were evaluated as in Cycle Characteristics Evaluation 2. The evaluation results are shown in Table 5.

TABLE 5

| | Fabrication requirements | | | | | | | Specific | | | | |
| --- | --- | --- | --- | --- | --- | --- | --- | --- | --- | --- | --- | --- |
| | Composition | | | | Orthoboric acid | Washing liquid | | Slurry concentration | surface area of second particle | LiOH content | Sulfuric acid content | Na content | Capacity maintenance ratio (%) |
| | | | | | | Solute | Na+ concentration | | | | | | |
| | Li | Ni | Co | Al | (mol %) | | (mol/L) | (mass %) | (m²/g) | (mass %) | (mass %) | (ppm) | |
| Example 6 | 1.03 | 0.86 | 0.11 | 0.03 | 0.1 | Sodium sulfate | 0.156 | 45 | 2.15 | 0.36 | 0.15 | 410 | 96 |
| Comaparative Example 7 | 1.03 | 0.86 | 0.11 | 0.03 | | Lithium sulfate- | — | 30 | 2.16 | 0.37 | 0.28 | 40 | 95 |

As shown in Table 5, the positive electrode active material of Comparative Example 7 showed a lower capacity maintenance rate and poorer battery performance than the positive electrode active material of Example 6.

Evaluation of Resistance Increase Rate

With respect to the positive electrode containing the positive electrode active material obtained by the same or a similar manufacturing method as that obtained in Example 5 and Comparative Examples 5 and 6, the resistance increase rate was evaluated as follows.

Example 7

Provision of Positive Electrode Active Material

A positive electrode active material for evaluation was provided by the same or a similar manufacturing method as in Example 5.

Fabrication of Positive Electrode 92 parts by mass of each of the mixed positive electrode active materials obtained above, 3 parts by mass of acetylene black, and 5 parts by mass of polyvinylidene difluoride (PVDF) were dispersed and dissolved in N-methyl-2-pyrrolidone (NMP) to provide a positive electrode slurry. The resultant positive electrode slurry was applied to an aluminium foil current collector and dried. After drying, a positive electrode of Example 7 was obtained by compression molding with a roll press machine so that the density of the positive electrode active material layer was 2.8 g/cm$^3$, and cutting into a size of 15 cm$^2$. The density of the positive electrode active material layer was calculated by dividing the mass of the positive electrode active material layer by the volume of the positive electrode active material layer calculated by measuring the thickness of the positive electrode active material layer with a micrometer.

Fabrication of Battery for Evaluation

Battery for evaluation was fabricated in the same or a similar manner as in Cycle Characteristics Evaluation 2 except for using the positive electrode obtained above.

Example 8

A positive electrode of Example 8 was obtained in the same or a similar manner as in Example 7 except that compression molding was performed so that the density of the positive electrode active material layer was 3.3 g/cm$^3$. Then, a battery for evaluation was obtained in the same or a similar manner as in Example 7 except that this was used.

Example 9

A positive electrode of Example 9 was obtained in the same or a similar manner as in Example 7 except that compression molding was performed so that the density of the positive electrode active material layer was 3.5 g/cm$^3$. Then, a battery for evaluation was obtained in the same or a similar manner as in Example 7 except that this was used.

Example 10

A positive electrode of Example 10 was obtained in the same or a similar manner as in Example 7 except that compression molding was performed so that the density of the positive electrode active material layer was 3.7 g/cm$^3$. Then, a battery for evaluation was obtained in the same or a similar manner as in Example 7 except that this was used.

Comparative Example 8

A positive electrode of Comparative Example 8 was obtained in the same or a similar manner as in Example 7 except that the positive electrode active material obtained by the same or a similar manufacturing method as in Comparative Example 5 was used. Then, an evaluation battery was obtained in the same or a similar manner as in Example 7 except that this was used.

Comparative Example 9

A positive electrode of Comparative Example 9 was obtained in the same or a similar manner as in Comparative Example 8 except that compression molding was performed so that the density of the positive electrode active material layer was 3.3 g/cm$^3$. Then, a battery for evaluation was obtained in the same or a similar manner as in Example 7 except that this was used.

Comparative Example 10

A positive electrode of Comparative Example 10 was obtained in the same or a similar manner as in Comparative Example 8 except that compression molding was performed so that the density of the positive electrode active material layer was 3.5 g/cm$^3$. Then, a battery for evaluation was obtained in the same or a similar manner as in Example 7 except that this was used.

Comparative Example 11

A positive electrode of Comparative Example 11 was obtained in the same or a similar manner as in Comparative Example 8 except that compression molding was performed so that the density of the positive electrode active material layer was 3.7 g/cm$^3$. Then, a battery for evaluation was obtained in the same or a similar manner as in Example 7 except that this was used.

Comparative Example 12

A positive electrode of Comparative Example 12 was obtained in the same or a similar manner as in Example 7 except that the positive electrode active material obtained by the same or a similar manufacturing method as in Comparative Example 6 was used. Then, a battery for evaluation was obtained in the same or a similar manner as in Example 7 except that this was used.

Comparative Example 13

A positive electrode of Comparative Example 13 was obtained in the same or a similar manner as in Comparative Example 12 except that compression molding was performed so that the density of the positive electrode active material layer was 3.3 g/cm$^3$. Then, a battery for evaluation was obtained in the same or a similar manner as in Example 7 except that this was used.

Comparative Example 14

A positive electrode of Comparative Example 14 was obtained in the same or a similar manner as in Comparative Example 12 except that compression molding was performed so that the density of the positive electrode active material layer was 3.5 g/cm$^3$. Then, a battery for evaluation was obtained in the same or a similar manner as in Example 7 except that this was used.

Comparative Example 15

A positive electrode of Comparative Example 15 was obtained in the same or a similar manner as in Comparative Example 12 except that compression molding was performed so that the density of the positive electrode active material layer was 3.7 g/cm³. Then, a battery for evaluation was obtained in the same or a similar manner as in Example 7 except that this was used.

Aging

The resultant batteries for evaluation were electrically charged and discharged once by constant-voltage/constant-current charging at a charge voltage of 4.2 V (counter electrode C) and a charge current of 0.1 C, and constant current discharging at a discharge voltage of, 2.75 V (counter electrode C) and a discharge current of 0.2 C. Subsequently, the charge current was changed to 0.2 C, and charge and discharge was carried out twice to apply the non-aqueous electrolyte on the positive and negative electrodes well.

Measurement of AC Impedance

After aging, the batteries for evaluation were charged to a state of charge (SOC) of 100% by constant-voltage/constant-current charging at a charging voltage of 4.2V and a charging current of 0.2 C. Using an impedance measuring device (1470E and 1455A, both manufactured by SOLARTRON Co., Ltd.), resistance measurements were performed in the range of 1 MHz to 0.1 Hz by the AC impedance method to obtain a Nyquist plot. After the above resistance measurement, constant current discharge was performed at a discharge voltage of 2.75 V and a discharge current of 0.2 C. Then, 1 cycle including constant-voltage/constant-current charging at a charging voltage of 4.2V and charging current of 1 C, and constant current discharging at a discharging voltage of 2.75V and discharge current of 1 C at a constant temperature of 45° C., and 200 cycles of charging/discharging were performed. After 200 cycles of charging/discharging, the batteries for evaluation were charged to SOC 100% by constant-voltage/constant-current charging at a charging voltage of 4.2V and a charging current of 0.2 C, and the resistance measurements were performed in the same or a similar manner using the above impedance measuring device to obtain a Nyquist plot.

Calculation of Resistance Increase Rate

Figure 4:
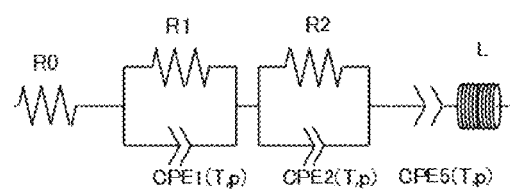
FIG. 4 is an equivalent circuit model used in AC impedance measurement.

Based on the obtained Nyquist plot, the equivalent circuit model of FIG. 4 was assumed and the fitting calculation was performed. The higher peak frequency of the arc component of the impedance obtained by the measurement was defined as the resistance derived from the negative electrode, and the lower peak frequency was defined as the resistance R derived from the positive electrode. The resistance value derived from the positive electrode before the cycle was calculated as R(p), the resistance value derived from the positive electrode after the cycle was defined as R(a), and R(a)/R(p)×100(%) was calculated as the resistance increase rate. Then, as in Comparative Example 8 with respect to Example 7, the resistance increase rate in the Example or Comparative Example in which the positive electrode active material was washed with the cleaning liquid was divided by the resistance increase rate in the Comparative Example in which the positive electrode active material was washed with pure water and the positive electrode active material layer was provided with the same or a similar density to calculate a relative resistance increase ratio. Table 6 shows the evaluation results for Examples 7 to 10 washed with an aqueous sodium sulfate solution and Comparative Examples 12 to 15 washed with an aqueous lithium sulfate solution.

TABLE 6

|  | Solute of washing liquid | Density (g/cm³) | Relative resistance increase ratio |
| --- | --- | --- | --- |
| Example 7 | Sodium sulfate | 2.8 | 0.552 |
| Comparative Example 12 | Lithium sulfate | 2.8 | 0.708 |
| Example 8 | Sodium sulfate | 3.3 | 0.455 |
| Comparative Example 13 | Lithium sulfate | 3.3 | 0.723 |
| Example 9 | Sodium sulfate | 3.5 | 0.471 |
| Comparative Example 14 | Lithium sulfate | 3.5 | 0.725 |
| Example 10 | Sodium sulfate | 3.7 | 0.641 |
| Comparative Example 15 | Lithium sulfate | 3.7 | 0.808 |

As shown in Table 6, at any density of positive electrode active material layer, the relative resistance increase ratio in the positive electrode of the Example containing the positive electrode active material obtained through the washing step using the salt aqueous solution containing sodium ions was low and the deterioration of the output after the cycle was suppressed. From these results, it was confirmed that, not only in the capacity maintenance ratio, but also in resistance, the characteristics of the non-aqueous electrolyte secondary battery containing the positive electrode active material obtained through the washing step by using the salt aqueous solution containing sodium ions are improved.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes can be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or a similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method of producing a positive electrode active material, the method comprising:
contacting first particles that contain a lithium transition metal composite oxide with a solution containing sodium ions to obtain second particles containing the lithium transition metal composite oxide and sodium element, wherein the lithium transition metal composite oxide has a layered structure and a composition ratio of a number of moles of nickel to a total number of moles of metals other than lithium in a range of from 0.7 to less than 1;
mixing the second particles and a boron compound to obtain a mixture; and
heat-treating the mixture at a temperature in a range of from 100° C. to 450° C.

2. The method according to claim 1, wherein the second particles have a sodium element content in a range of from 100 ppm to 1400 ppm.

3. The method according to claim 2, wherein the mixture contains the boron compound in an amount of from 0.1% by mole to 2% by mole in terms of a ratio of a number of moles of boron element relative to the total number of moles of metals other than lithium in the lithium transition metal composite oxide.

4. The method according to claim 3, wherein the lithium transition metal composite oxide contains cobalt and has a ratio of a number of moles of cobalt to the total number of moles of metals other than lithium in the lithium transition metal composite oxide of 0.3 or less.

5. The method according to claim 4, wherein the lithium transition metal composite oxide contains at least one of manganese and aluminium and has a ratio of a number of moles of manganese and aluminium to the total number of moles of metals other than lithium in the lithium transition metal composite oxide of 0.3 or less.

6. The method according to claim 1, wherein the mixture contains the boron compound in an amount of from 0.1% by mole to 2% by mole in terms of a ratio of a number of moles of boron element relative to the total number of moles of metals other than lithium in the lithium transition metal composite oxide.

7. The method according to claim 1, wherein the lithium transition metal composite oxide contains cobalt and has a ratio of a number of moles of cobalt to the total number of moles of metals other than lithium in the lithium transition metal composite oxide of 0.3 or less.

8. The method according to claim 1, wherein the lithium transition metal composite oxide contains at least one of manganese and aluminium and has a ratio of a number of moles of manganese and aluminium to the total number of moles of metals other than lithium in the lithium transition metal composite oxide of 0.3 or less.

9. The method according to claim 1, wherein the lithium transition metal composite oxide has a composition represented by formula (1):

$$Li_{(1+p)}Ni_{(1-x-y-z-w)}Co_xMn_yAl_zM_wO_2 \quad (1)$$

wherein $-0.05 \leq p \leq 0.2$, $0 < x+y+z+w \leq 0.3$, $0 \leq x \leq 0.3$, $0 \leq y \leq 0.3$, $0 \leq z \leq 0.1$, and $0 \leq w \leq 0.03$; and M is at least one selected from the group consisting of Zr, Ti, Mg, Ta, Nb, Mo, and W.

* * * * *